United States Patent [19]

Kurz et al.

[11] Patent Number: 5,480,016
[45] Date of Patent: Jan. 2, 1996

[54] ARRANGEMENT FOR FASTENING A CLUTCH TO A CRANKSHAFT

[75] Inventors: Walter Kurz, Durach; Wolfgang Baier, Obbach; Uwe Meinig, Weinheim-Steinklingen, all of Germany

[73] Assignee: Fichtel & Sachs AG, Germany

[21] Appl. No.: 215,322

[22] Filed: Mar. 21, 1994

[30] Foreign Application Priority Data

Mar. 26, 1993 [DE] Germany ............................ 43 09 871.1

[51] Int. Cl.⁶ ............................ B60K 17/02; F16D 13/60
[52] U.S. Cl. .................. 192/70.16; 74/572; 192/DIG. 1; 403/274; 403/370
[58] Field of Search ............................ 192/70.16, 110 R, 192/70.13, DIG. 1; 403/274, 279, 240, 248, 374, 370, 368; 74/572; 29/893.2, 507, 522.1, 523, 525

[56] References Cited

U.S. PATENT DOCUMENTS

| 485,678 | 11/1892 | Ash | 403/248 |
|---|---|---|---|
| 490,876 | 1/1893 | Kirsch-King | 403/370 |
| 3,776,651 | 12/1973 | Peter et al. | 403/248 |
| 4,480,490 | 11/1984 | Inoue | 403/368 X |
| 4,569,114 | 2/1986 | Ashcombe et al. | 74/572 X |

FOREIGN PATENT DOCUMENTS

| 0078163 | 5/1983 | European Pat. Off. . | |
| 2492022 | 4/1982 | France . | |
| 2589959 | 5/1987 | France . | |
| 2689192 | 10/1993 | France . | |
| 872886 | 4/1953 | Germany . | |
| 1162640 | 2/1964 | Germany . | |
| 2808696 | 9/1979 | Germany | 403/374 |
| 3315232 | 11/1983 | Germany . | |
| 8911061 | 10/1989 | Germany . | |
| 4013298 | 10/1991 | Germany . | |
| 4117571 | 12/1991 | Germany . | |
| 582479 | 11/1946 | United Kingdom | 403/248 |
| 885699 | 12/1961 | United Kingdom . | |

OTHER PUBLICATIONS

"Transmission Clutch and Flywheel Concept," Automotive Engineering, vol. 101, No. 1 (Jan. 1993), pp. 13–15.

K. Wiecking, R. Gebauer; Die Motoren der Personenkraftwagen (Engines of Passenger Vehicles), Chr. Belser Verlag, Stuttgart; 1952, p. 314.

Primary Examiner—Rodney H. Bonck
Attorney, Agent, or Firm—Brumbaugh, Graves, Donohue & Raymond

[57] ABSTRACT

An input component (3) of a clutch is fastened to the output end (5) of the crankshaft (7) of an internal combustion engine by a force-fit coupling (11) in which a radial force fit is produced by axial forces which are applied to the coupling (11) by a tool inserted through the hub (21) of a clutch disc (23) or applied to the hub, which in turn applies the axial force on the coupling. The coupling enables the clutch (1), including the flywheel (3) and the clutch disc (23), to be installed on the crankshaft (7) as an assembled unit. The force-fit coupling (11) comprises an expanding conical, element (61), arranged in a central opening (59) of the output end (5) of the crankshaft (7), which expands the output end (5) of the crankshaft radially.

45 Claims, 7 Drawing Sheets

ARRANGEMENT FOR FASTENING A CLUTCH TO A CRANKSHAFT

BACKGROUND OF THE INVENTION

The present invention relates to an arrangement for the coaxial fastening of an input component of a clutch, such as a friction clutch, to a crankshaft of an internal combustion engine of a motor vehicle.

Ordinarily, conventional friction clutches of motor vehicles comprise a one or two-part flywheel, to which a pressure plate unit is fastened by screws. The pressure plate unit comprises an axially movable pressure plate that is rotationally fixed to but axially movable on a clutch housing fastened to the flywheel by screws and is preloaded by a main clutch spring, usually a diaphragm spring, toward the flywheel. The pressure plate and the flywheel form friction surfaces for a clutch disc positioned between them. The clutch disc has a hub that is rotationally fixed to but axially movable on an input shaft of a transmission in the drivetrain of the motor vehicle. The flywheel is fastened by screws to an end flange of the engine crankshaft by a plurality of screws arranged concentrically to the axis of rotation of the crankshaft.

In conventional friction clutches, the clutch disc and the diaphragm spring overlie in the axial direction the screws that attach the flywheel to the end flange of the crankshaft. Therefore, in assembly of the friction clutch, the flywheel must first be fastened to the crankshaft end flange before the clutch disc can be put in place and the pressure plate unit screwed to the flywheel. This assembly process is not only time-consuming, but also has the disadvantage that the friction clutch as a whole, i.e., including the clutch disc and the flywheel, cannot be inspected for compliance with specifications before assembly.

German Published Patent Appln. No. 4,117,571 discloses an arrangement in which the clutch disc and the diaphragm spring are provided with holes which are aligned axially with the screws for fastening the flywheel to the end flange of the crankshaft. In this way the pressure plate unit can be assembled to the clutch disc and the flywheel into a preassembled unit (a modular clutch) before installation on the crankshaft. The fastening screws may be screwed into the end flange of the crankshaft through the holes of the clutch disc and the diaphragm spring.

In German Published Patent Appln. No. 3,315,232, it is proposed that a modular clutch, consisting of flywheel, pressure plate unit and clutch disc, in which the clutch housing and the flywheel are preassembled non-detachably, be fastened to the output end of the crankshaft by means of a central screw. The output end of the crankshaft has a threaded hole for receiving a screw. The screw has a flange projecting radially, which tightens the flywheel against the axial end face of the output end of the crankshaft. The screw is hollow and receives a pilot bearing, which radially carries the engine-side end of the transmission input shaft that passes through the hub of the clutch disc. However, the torque transmissible through the radial flange of the screw is comparatively low, since the screw can only sustain limited starting torques.

It is disclosed in German Published Patent Appln. No. 4,013,298 that for fastening the flywheel of a modular clutch, the axially facing faces of an end flange of the crankshaft and of the flywheel may be provided with a radial toothing (Hirth-type serrations) and the flywheel in turn be fixed axially to the output end of the crankshaft by a central screw that also receives the pilot bearing of the transmission input shaft. In this case, the screw only takes care of axial fixation, while the torque is transmitted to the flywheel by means of the radial toothing of the crankshaft. The screw, which is screwed into a central threaded opening of the output end of the crankshaft, is provided in the region of the pilot bearing with central key faces into which a screwdriver can be inserted through the hub of the clutch disc in order to tighten the screw on the crankshaft.

Lastly, it is disclosed in the book by K. Wiecking and R. Gebauer, "Die Motoren der Personenkraftwagen" [Engines of Passenger Vehicles], Verlag Chr. Belser, Stuttgart, 1952, page 314, figure 341, that the flywheel of a conventional friction clutch may be fastened by means of a cone compression coupling at the output end of the crankshaft of the internal combustion engine. The output end bears an external cone, tapering toward the clutch disc, on which the flywheel is seated by an internal cone of its hub. The output end of the crankshaft terminates in a threaded pin, on which is screwed a nut securing the flywheel. However, the known design does not make it possible to install the pressure plate unit together with the clutch disc and the flywheel as a preassembled unit.

SUMMARY OF THE INVENTION

One object of the invention is to provide an arrangement which, by simple means, permits a friction clutch whose input component and output component are preassembled (modular clutch) to be fastened to the output end of the crankshaft so that even high torques can be reliably transmitted. In addition, it should be possible for assembly to be performed simply.

According to one aspect of the invention, there is provided an arrangement for the coaxial fastening of an input component of a friction clutch to a crankshaft of an internal combustion engine of a motor vehicle, wherein the friction clutch has as an output component a clutch disc with a hub coaxial to the crankshaft and the output component is combined into a preassembled unit with the input component before being installed on the crankshaft. The input component is fastened to the output end of the crankshaft by a force-fit coupling between associated joining faces on the input component and the output end that extend substantially axially. Tool-application surfaces are provided on the force-fit coupling, by which the joining faces, upon assembly, can be tightened against one another in a radial force fit.

The force-fit coupling is, preferably, arranged so that the joining faces are radially tightened upon application of forces acting axially on the tool-application surfaces and so that the tool-application surfaces are accessible axially through the hub of the clutch disc and/or the hub of the clutch disc is capable of being displaced and applying forces to the tool-application surfaces.

Like the conventional fastening arrangements described above, the invention is based on a central connection which can be locked axially by tools applied centrally through the components of the friction clutch. However, while in conventional central connections in which a central screw is used to fasten the flywheel to the crankshaft and other elements, such as teeth or indexing pins, the invention takes another approach; namely, the force-fit coupling is locked directly by axial forces. It has been found that, with regard to transmission of reaction forces of the crankshaft, axial forces are readily controllable, not least because of the great mass of the crankshaft. The force-fit coupling can easily be sized so that the press fit not only transmits the torque in operation, but in most cases also provides for axial securing of the friction clutch to the crankshaft without additional securing measures. Proper design of the tool-application surfaces makes it possible for them to be used for disassembly as well. The fastening arrangement according to the invention is particularly suitable for modular clutches in which the clutch housing is connected permanently to a flywheel forming the input component.

In a preferred embodiment, the input component has a central opening, the wall of which opening forms one of the joining faces. A portion of the output end of the crankshaft fits into the opening and forms the other one of the two joining faces. The crankshaft output end contains a central front opening in which is seated an expanding element that forces the output end radially outward against the input component and at least the expanding element has an axially loadable tool-application surface. The expanding element preferably has a cone-shaped outer surface which is associated with a cone-shaped inner surface in the front opening. The cone-shaped inner surface may be formed directly on the front opening or it may be formed on a coned sleeve inserted in the front opening. Axial front faces of the expanding element or of the input component of the clutch may serve as tool-application surfaces of the force-fit coupling, into which the axial forces are introduced either directly or indirectly through components arranged in between, for example, the hub of the clutch disc or, optionally, existing annular extensions of the input component. However, internal threads of central threaded holes of the crankshaft as well as of the expanding element are also particularly suitable as tool-application surfaces.

In the embodiments described above, the radial force-fit is produced by the expanding element, which radially expands the crankshaft-side joining faces. The associated fit tolerances of the two joining faces may thus fit one another in an assembly fit or, optionally, a transition fit, so that the input component can be slipped more or less loosely onto the output end of the crankshaft. Alternatively and optionally in addition to the above embodiments, it is provided in another variant that the joining faces form a coned interference fit or a cylindrical interference fit, i.e., the joining faces extending substantially axially have a force-fit initially, and that the input component or a central annular part, axially movable together with the input component relative to the crankshaft, radially overlaps the axially movable hub of the clutch disc and in this region has a tool-application surface accessible axially through the hub or an axial working surface, against which the hub is capable of application, while in the case last mentioned the hub of the crankshaft likewise has an axial tool-application surface, turned away axially. In this variant, the input component of the friction clutch is seated in a force fit determined by its dimensions at the output end of the crankshaft and the axial compressive forces are transmitted to the input component by appropriate pressing tools which act on it either directly through the hub of the clutch disc or else indirectly through the intermediary of an axially movable central annular part and/or the hub of the clutch disc itself. In order to reduce the compressive forces in assembly, the joining faces of the input component optionally may be expanded thermally by heating.

The input component of the friction clutch may engage the crankshaft by, for example, a boss forming the joining face that is received in an opening at the output end of the crankshaft. A sturdy arrangement is one in which the input component, at its inner periphery, has a central opening forming one of the joining faces, in which the output end of the crankshaft engages by a region forming the other one of the two joining faces. In this way, greater torques may also be transmitted. If the hub of the clutch disc does not radially overlap the input component or else the hub is not to be used for the transmission of axial tool forces, the annular part then provided may be equipped with a guide pin which engages in a central front face of the output end of the crankshaft.

The annular part advantageously contains a through-hole through which a rod can be screwed into a threaded bore of the crankshaft that extends into the crankshaft more deeply than the front opening. The reaction force produced when the input component is pressed on the crankshaft can be absorbed by such a rod.

In order to be able to remove the input component from the output end of the crankshaft, the annular part may be firmly joined with the input component and contain a thread in its through-hole for screwing in a connecting rod. One of the two joining faces, in particular the radially inner one of the two faces, may alternatively contain at least one continuous annular groove, which is connected by at least one radial channel of the crankshaft with a central pressure-medium connection, accessible axially from outside, in the region of the front opening. By forcing a pressure medium, hydraulic oil, for example, into the annular groove, the input component is expanded relative to the output end, so that it can be removed axially.

As mentioned above, the flywheel of conventional friction clutches, and a housing forming the input component of a hydrodynamic clutch or a torque converter as well, is conventionally fastened by several screws to an annular flange projecting radially from the output end of the crankshaft. In such a connection the associated joining faces transmitting the torque run in a plane essentially perpendicular to the shaft, which likewise transmit torques acting between the crankshaft and the input component. Installing the numerous screws required for fastening makes assembly relatively time-consuming. In addition, the diameter of the fastening flange at the output end of the crankshaft must be of large diameter, since it accommodates the threaded holes for the fastening screws. On the other hand, however, the output end of the crankshaft emerging from the engine housing of the internal combustion engine must be sealed off oil-tight from the engine housing by a sealing ring. In order to be able to install a sealing ring, the sealing ring must be seated on the outer periphery of the fastening flange projecting radially from the output end of the crankshaft and hence have a greater diameter than would be required without a fastening flange, in view of the shaft regions of the crankshaft connected thereto. The large sealing ring diameter required by the previously known fastening arrangements thus necessarily leads to increased sealing ring friction and hence to increased fuel consumption of the internal combustion engine, as well as to increased wear of the seal.

According to another aspect of the invention, which is of importance in connection with the fastening arrangement described above as well as independently thereof in other types of clutches, it is another object of the invention to provide an arrangement for fastening an input component of a clutch to the crankshaft of an internal combustion engine which permits the diameter of the crankshaft to be kept comparatively small in the region of the output end and, permits the transmission of high torques through the fastening arrangement, and is easy to install.

According to the second aspect, there is provided an arrangement for coaxial fastening of an input component of a clutch, in particular a friction clutch, a hydrodynamic clutch or a torque converter, to a crankshaft of an internal combustion engine of a motor vehicle. The input component is fastened to the output end of the crankshaft by a force-fit coupling that has associated joining faces extending substantially axially, one face being on the inner periphery of a central opening of the input component and the other face being on the outer periphery of a portion of the output end extending axially into the opening. According to the invention, the output end of the crankshaft has a central front opening, in which is seated an expanding element that forces the output end radially outward against the input component. The outside diameter of the expanding element is increasable relative to the inside diameter of a radially inwardly facing region of the front opening by application of an axial force to the expanding element.

In such an arrangement the diameter of the joining faces determines the diameter of the output end of the crankshaft and thus essentially the inside diameter of the sealing ring arrangement sealing off the output end relative to the engine housing. Since sufficiently great torques can be transmitted by even comparatively small joining face diameters, the sealing ring diameter may be reduced to values which are substantially equal to or less than the joining face diameters or which are substantially equal to or less than the diameter of the adjacent main crankshaft bearing. This measure considerably reduces sealing ring friction.

The associated joining faces of the output end and of the input component may be sized for an assembly fit or optionally an easy transition fit, so that the input component can be slipped on the output end initially without special tools or, optionally, with slight thermal expansion of the input component. For locking the force-fit coupling the expanding element need only be actuated axially, which can be done with relatively little tool effort and consumption of time, since the expanding element works centrally.

In a preferred arrangement, the expanding element, as described above, has a conical outer surface and the front opening of the crankshaft or a coned sleeve inserted in the front opening has a conical inner surface associated with the conical outer surface. The variant last mentioned in particular, despite having more components, offers advantages, since in this case the front opening of the output end of the crankshaft may be cylindrical. When a coned sleeve is not used, the conical outer surface of the expanding element must be tapered inwardly in a direction axially away from the end of the crankshaft and must be inserted into the crankshaft upon assembly of the input component. However, the alternative variant, in which the expanding element tapers inwardly in a direction toward the end of the crankshaft, which, however, requires a coned sleeve of the aforementioned type in order to be able to install the expanding element, is likewise of advantage. In particular, it is advantageous that the coned sleeve and the expanding element can be inserted into the front opening of the crankshaft and fixed there by means, for example, of a securing ring before the input component is slipped on. However, for axial fixation of the coned sleeve during tightening of the force-fit coupling by removal of the expanding element, it may alternatively be provided that the input component radially overlap the coned sleeve, or else that the hub of the clutch disc be shifted axially against the coned sleeve to hold it axially during assembly, so that it may be used as a stop.

For tightening the force-fit coupling, radially widening undercut surfaces may be provided on the expanding element in a central axial opening accessible axially from outside, to, which a tool, such as a tension rod or the like, may be applied. The undercut surfaces are most simply provided by a central axial threaded bore. In an expanding element tapering axially away from the crankshaft, the tool rod screwed into the threaded bore of the expanding element may be supported on the base or some other supporting surface of the front opening aligned axially with the threaded bore and so drive the cone-shaped expanding element in locking direction. However, external tensile forces may alternatively be exerted on the tool rod, which, however, in the case of continuous tensile loading requires additional tools such as a sleeve surrounding the tool rod and supported directly on the coned sleeve or the crankshaft. It is understood that the reaction forces to be resisted may also be conducted through the hub of the clutch disc. In that case and in other variants as well, the transmission of reaction forces from the crankshaft may optionally be dispensed with when the axial forces exerted on the expanding member are applied in a pulsed manner, since then the comparatively great axial mass moment of inertia of the crankshaft is able to absorb the impact load without fear of damage to the crankshaft bearings. However, at least for absorption of the initial impact load when the flywheel is not yet coupled to the crankshaft, a tool for absorbing the reaction force may be provided. The embodiments described above require cones that are self-locking in the axial direction. An embodiment which may be used with expanding elements having a non-self-locking outer cone includes, in central openings of the expanding element as well as of the crankshaft, threaded bores with like thread direction but unlike thread pitch. The threaded bores accommodate a differential threaded screw, by means of which the expanding element is displaceable, reinforced in axial strength, in the direction of tightening relative to the crankshaft. The threaded bores may, alternatively, have opposite thread directions.

In an advantageous design, one of the conical surfaces, in particular the conical outer surface of the expanding element, contains at least one annular groove which is connected by at least one radial channel of the expanding element with a pressure-medium connection of the expanding element accessible axially from outside. The two conical outer surfaces optionally are sealed off axially from one another on either side of the annular groove by additional sealing rings. This arrangement makes it possible to expand the radial interference fit hydraulically, so that the expanding element can be released for disassembly of the clutch with ease.

In some embodiments, either the expanding element or the output end of the crankshaft has a central opening that receives a pilot bearing for the radial guidance of a transmission input shaft or a guide pin of a torque converter or, the like. If the expanding element is provided with a central threaded opening for the application of tool forces to the crankshaft, the inside diameter of the pilot bearing is selected so that the tool can be inserted without the pilot bearing being disassembled or damaged. If the pilot bearing is arranged on the side of the threaded opening of the expanding element remote from the clutch, it advantageously has a smaller inside diameter than the threaded opening; otherwise, it will have a greater inside diameter.

In the variants described above, the expanding element is designed as a cone. However, other expanding elements which can be expanded radially by application of axial forces are applicable. A stack of a number of Belleville spring lying flat on one another and having central openings through which passes a clamping bolt that is screwed into a central threaded bore of the crank-shaft is particularly suitable. In the relaxed state the Belleville springs, optionally provided with radial fingers, have a slightly conical shape which flattens out upon tightening, with an increase in diameter. It may optionally be provided that the Belleville springs have rounded outer edges, while the inner surface of the opening of the input component is provided with a plurality of continuous grooves for accommodation of the rounded outer edges of the Belleville springs. This measure increases the axial holding force of the Belleville springs. The Belleville springs may possibly get so jammed in the tightened state that they cannot be automatically released when the clamping bolt is loosened. In order nevertheless to be able to disassemble the input component of the clutch, the clamping bolt may have an annular shoulder overlapping the Belleville springs radially and located on the side of the spring stack away from the end of the crankshaft.

The front opening allows a tubular extension to be produced at the output end of the crankshaft which, for reasons of flexural strength and dimensional stability of the output end, preferably is closed ringlike. It has been found that the radial forces applied by the expanding element suffice not only to secure the radial interference fit, but also to expand the tubular extension sufficiently. However, particularly in the case of great wall thicknesses of the tubular extension or for high compressive force requirements, it may alternatively be advantageous for the output end to have, at least over part of the axial extension of its joining face, at least one, and preferably several, axial slots spaced apart in the peripheral direction.

The joining faces of the output end of the crankshaft and of the input component of the clutch advantageously have a circular cylindrical shape or else a self-locking conical shape. In both cases the input component need not be additionally secured axially to the output end of the crankshaft by separate means. Circular cylindrical surfaces in particular have the advantage that exact axial positioning of the input component relative to the crankshaft can be obtained by associated axial annular stop faces of the input component and the output end.

The force-fit couplings described above all have the advantage that the shaft diameter of the crankshaft in the region of the engine housing-side crankshaft seal may be sized smaller than has been customary in practice. In particular, the inside diameter of the sealing ring arrangement may be approximately equal to the outside diameter of the joining face of the output end of the crankshaft and/or of the inside diameter of the crankshaft bearing or even smaller than the inside diameter of the crankshaft bearing. In this way, while meeting the mechanical strength requirements of the crankshaft, the friction of the sealing ring arrangement can be minimized.

The region of the joining opening of the input component of the clutch must be able to absorb the radial compressive forces and should therefore be comparatively sturdy. On the other hand, particularly for use as a flywheel, it is desired to arrange the mass of the input component as far radially outside as possible. In a preferred arrangement, it is therefore provided that the input component have an annular hub forming the joining surface of the input component, from which there projects, in reference to the axial extension of the hub, a thin disc-like flange. The hub and the flange may be integrally joined, but the flange preferably is designed as a shaped metal part which is welded or riveted on the separately produced hub.

The hub should be able not only to absorb the radial compressive forces, but also to carry the input component of the clutch in exact alignment axially with the axis of the crankshaft. This can be obtained relatively simply in that from the hub there projects a tubular extension whose radial wall thickness is smaller than the radial thickness of the hub, and the joining face of the input component extends into the tubular extension. While the thicker region of the hub absorbs the major part of the radial compressive forces, the tubular extension improves centering and alignment, without the diameter appropriate for sealing off the crankshaft from the engine housing having to be substantially increased. Therefore, sealing may alternatively be effected at the outer periphery of the tubular extension and hence closely adjacent to the input component of the clutch.

In operation, fretting corrosion may form between the joining faces of the input component of the clutch and the output end of the crankshaft. Fretting corrosion may make disassembly of the input component difficult and possibly reduce the torque transmissible by the force-fit coupling. In order to prevent this, it is provided in a preferred design that the joining faces be additionally sealed. Sealing may be obtained by suitable coating of one of the joining faces with a roughness-compensating material. However, the joining faces are preferably cemented together. The cement, hardening after mounting, not only seals the joining faces and accordingly prevents fretting corrosion, but at the same time forms a sort of lubricant in assembly. In some cases, the transmissible torque can also be increased by cementing. Suitable selection of the cementing material can ensure that the bond can be broken again by defined forces. Optionally, thermally loosenable cementing materials may be used.

In order to keep the axial forces required for locking or breaking the force-fit coupling small, especially in conical expanding elements, at least one of the two associated tightening faces of the force-fit coupling may be coated with a friction-reducing lubricant or consist of a sintered material which contains a lubricant.

It is understood that the invention may be used not only in friction clutches whose input component comprises a one-piece flywheel, but whose flywheel forms a so-called two-mass flywheel with two flywheel masses coupled resiliently together rotationally and rotatable relative to one another, of which one is to be connected with the crankshaft and the other carries the pressure plate unit.

The various features of novelty which characterize the invention are pointed out with particularity in the claims annexed to and forming part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF PREFERRED EMBODIMENTS

Figure 1:
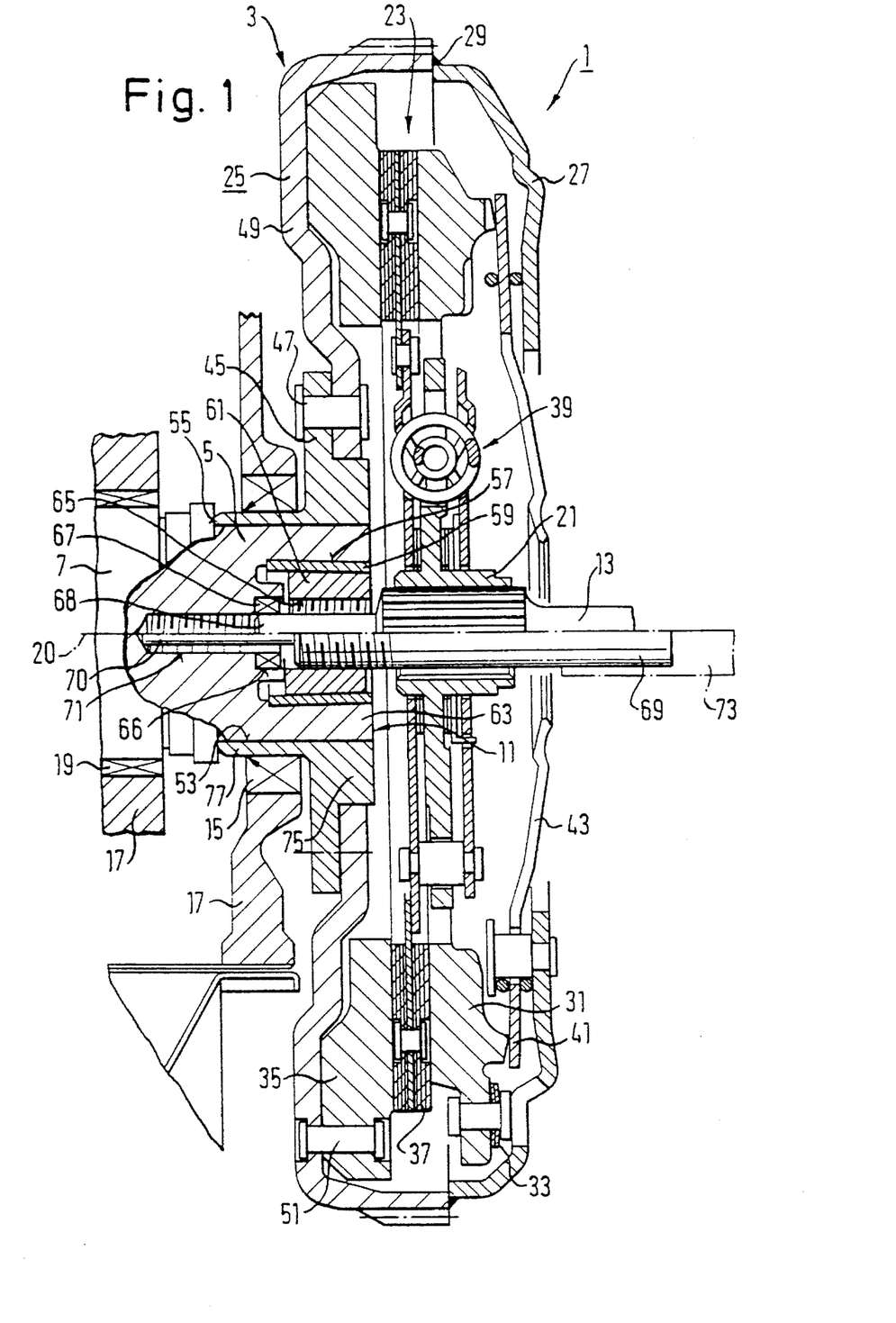
FIG. 1 is an axial longitudinal cross-sectional view through a modular clutch which is fastened by means of a force-fit coupling to the output end of a crankshaft of the internal combustion engine of a motor vehicle.

FIG. 1 shows a friction clutch 1, whose input component, generally labeled 3, is fastened to an output end 5 of a crankshaft 7 of an internal combustion engine of a motor vehicle by means of a force-fit coupling 11. The friction clutch 1 is a shift coupling arranged in the drive train of the vehicle between the internal combustion engine and a following gearbox, whose input shaft is indicated at 13. The output end 5 of the crankshaft 7 is sealed off from an engine housing 17 of the internal combustion engine by means of a sealing ring arrangement 15 and is supported for rotation in a crankshaft bearing 19 in the region of the sealing ring arrangement 15 on the engine housing 17 about an axis of rotation 20 that is aligned with the axis of rotation of the input shaft 13 of the transmission.

The friction clutch 1 is designed as a "modular clutch," so that it can be fastened as an assembled unit, which includes a clutch disc 23 that is rotationally fixed by means of a hub 21 but axially displaceable on the input shaft 13 in operation, to the output end of the crankshaft 7. The clutch 1 comprises as a part of the input component 3 a flywheel 25, to which a clutch housing 27 is fastened, such as by welds 29. A substantially annular disc-shaped pressure plate 31 is supported on the clutch housing 27 by means, for example, of leaf springs 33 such that it is rotationally fixed but axially movable relative to the housing. The pressure plate 31 accommodates between itself and a counterpressure plate 35 of the flywheel 25 friction linings 37 of the clutch disc 23, which are resiliently coupled rotationally in conventional fashion with the hub 21 by way of a torsional vibration damper 39. A diaphragm spring 41 held on the clutch housing 27 tightens the pressure plate 31 via the friction linings 37 in frictional engagement against the flywheel 25. The pressure plate can be released and the clutch disengaged by a throw-out lever (not shown) that acts on spring tongues 43 of the diaphragm spring 41.

It is understood that the clutch 1 illustrated in FIG. 1 represents only one example of a suitable clutch in which the present invention is applicable. Instead of the weld joint 29, which is not detachable, the clutch housing 27 may be fastened to the flywheel 25 by screws. In order to obtain the advantages attainable by the invention, it is sufficient for the flywheel 25, together with the clutch disc 23 and the "pressure plate unit," consisting of the pressure plate 31, the clutch housing 27 and the diaphragm spring 41, to be combined into an assembled unit which can be installed as such, in one operation, on the output end 5 of the crankshaft 7. In the example represented, the flywheel 25 consists of a shaped metal part 49, fastened to a hub 45 by means of a plurality of rivets 47, to which the counterpressure plate 35, designed, for example, as a casting, is fastened by rivets 51.

The hub 45 has an opening 53 that is concentric to the rotary shaft 21 and receives the output end 5 of the crankshaft. The inner surface of the opening 53 and the outer surface of the output end 5 form associated circular cylindrical joining faces, which in the case of an unloaded force-fit coupling 11 are seated in one another with an assembly fit or optionally a transition fit. An axial annular shoulder 55 of the output end 5 forms an axial stop face for axial positioning of the hub 45. A coned sleeve 59 is seated in a central circular cylindrical front opening 57 of the output end 5. The coned sleeve 59 likewise has a circular cylindrical outer surface. The inner surface is a conical surface that tapers convergently axially toward the end of the crankshaft 7. Seated within the coned sleeve 59 is an expanding element in the form of an expanding cone 61, whose conical outer surface expands radially. The tubular section 63 of the output end 5 forming the front opening 57 is expanded by the coned sleeve 59 when the expanding cone 61 is drawn in the axial direction toward the end of the crankshaft 7 relative to the coned sleeve 59. The tubular section 63, upon expanding, tightens the adjacent joining faces, which were initially only in the form of an assembly fit or a transition fit, into engagement with each other in a force fit between the output end 5 and the hub 45, which transmits the torque from the crankshaft 7 to the input part 3 of the friction clutch 1.

The cone angles of the coned sleeve 59 and/or the expanding cone 61 are made so small that self-locking occurs between these two parts, which makes additional axial fixation of the expanding cone 61 relative to the crankshaft 7 superfluous. In addition, the expanding cone 61 contains a central threaded through bore 65 behind which, on the side of the expanding cone 61 remote from the clutch, in a central recess 66 in the bottom of the front opening 57, is added a pilot bearing 67 for the transmission input shaft 13, represented in FIG. 1 only by its upper half. The pilot bearing 67 has a smaller inside diameter than the threaded bore 65 and conducts the input shaft 13 to a pin 68 passing through the threaded bore 65 in the assembled state.

For assembly, the friction clutch 1 is slipped by the hub 45 on the output end 5 and, before installation of the transmission, a connecting rod 69, provided with a thread at one end, is passed through the hub 21 of the clutch disc 23 and screwed into the threaded bore 65 of the expanding cone 61, by which the expanding cone 61 is drawn axially into its position locking the force-fit coupling 11. As represented at 70, the rod 69 may have a continuation, passing through the pilot bearing 67, which may be supported on the base of a threaded bore 71 extending the front opening 57 into the crankshaft. By screwing the connecting rod 69 into the threaded bore 65 the expanding cone 61 may be drawn into its locked position, without reaction forces having to be diverted from the crankshaft 7. The axial locking forces are exerted in a pulsed fashion on the connecting rod 69, which has the advantage that the reaction forces are absorbed by the comparatively great axial mass moment of inertia of the crankshaft 7 and axial support of the crankshaft 7 optionally is superfluous. In corresponding fashion, for disassembly, compressive forces may be exerted on the expanding cone 61 by the rod 69. In any case, however, the threaded bore 71 adjoining the front opening 59 makes it possible to divert reaction forces from the crankshaft 7 by screwing a connecting rod similar to the rod 69 through the hub 21 of the clutch disc 23 into the threaded bore 71, whose diameter is smaller than that of the threaded bore 65. Upon disassembly, a tensile force may be exerted on the crankshaft 7 by the rod, while the expanding cone 61 is axially released. Compressive reaction forces may alternatively be transmitted by this rod when, instead of the rod 69, a sleeve indicated at 73 is screwed into the threaded bore 65 of the expanding cone 61. The sleeve 73 and the rod screwed into the threaded bore 71 transmit, through the hub 21, forces of a tool working either in a pulsed manner or steadily, such as, for example, by a hydraulic press.

The hub 45 of the input part 3 has a ring 75, consisting, for example, of steel, which absorbs the major portion of the radial compressive forces. In the axial direction the ring 75 is thicker than the wall thickness of the shaped metal part 49 riveted to it, in order to make—despite the increased strength—only a comparatively small contribution to the total weight, referred to the moment of mass inertia of the flywheel 25. From the ring 75 an integral tubular extension 77 projects axially away from the clutch 1, which extends the joining face of the ring 75 axially and so provides for non-tilting coaxial guidance of the flywheel 25 at the output end 5.

The sealing arrangement 15 seals off the engine housing 17 relative to the cylindrical outer periphery of the tubular extension 77. Since the radial wall thickness of the tubular extension 77 is comparatively small, the inside diameter of the sealing arrangement 15 is only negligibly increased with respect to the diameter of the joining face of the output end 5. The inside diameter of the sealing arrangement 15 is thus substantially equal to or slightly greater than the bearing diameter of the main crankshaft bearing 19. Because of the comparatively small sealing ring diameter there is relatively little sealing ring friction, which viewed overall, leads to fuel savings. In addition, the reduced sealing ring diameter leads to a reduction of peripheral speed, which increases the service life of the sealing arrangement 15.

Variants of the force-fit coupling are explained below. Functionally similar components are provided with the reference numerals of FIG. 1 and, to differentiate them, with a letter of the alphabet. In each instance, reference may be made to the description of FIG. 1 for additional information.

Figure 2:
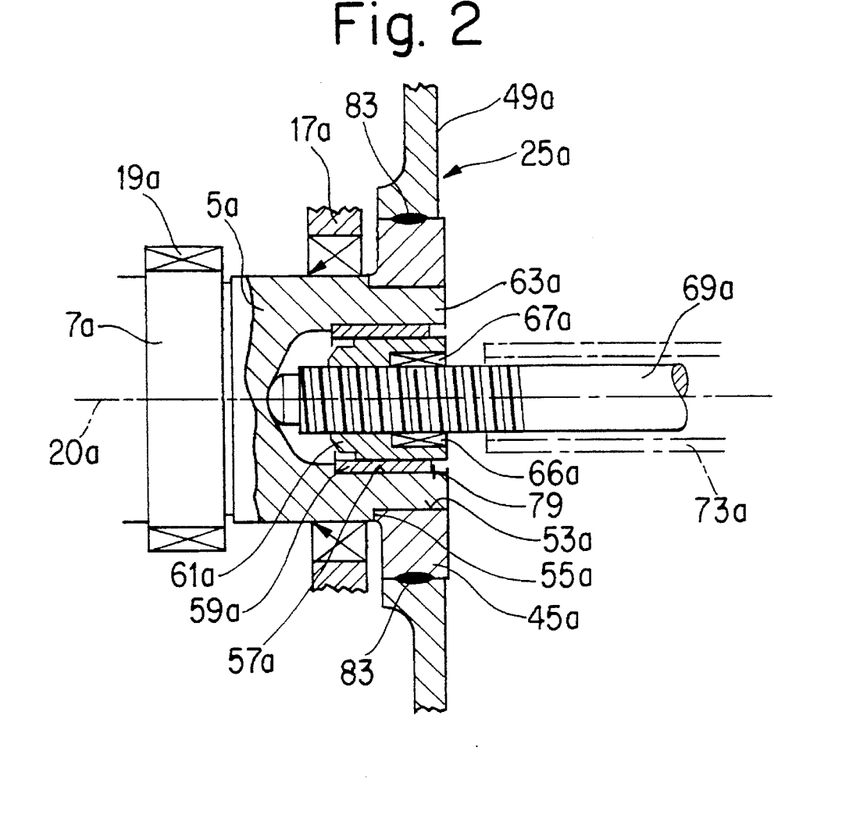
FIGS. 2 to 8, 2A, 5A, 6A and 8A are partial axial longitudinal cross-sectional views of other embodiments and variations of force-fit couplings, as alternatively applicable for fastening the modular clutch of FIG. 1.
Figure 2A:
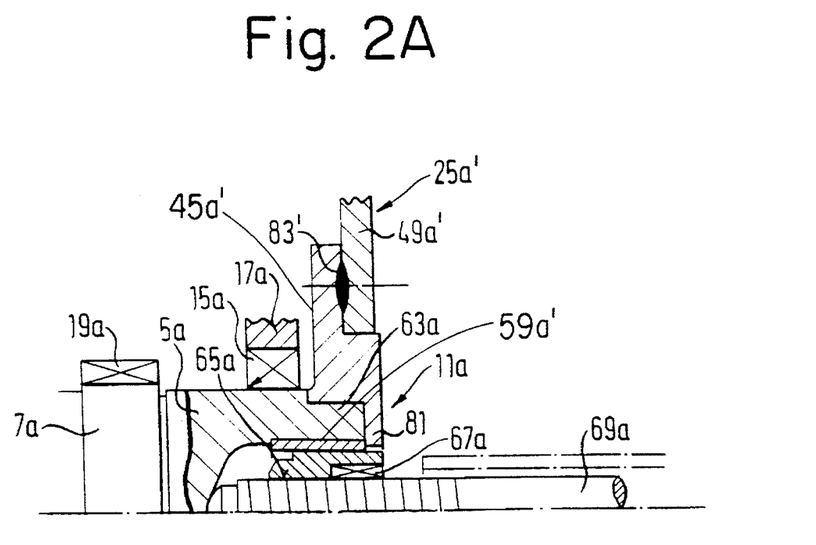

In the force-fit coupling 11 of FIG. 1, the coned sleeve 59 is fixed in the axial direction relative to the crankshaft 7 in the direction of extension of the expanding cone 61 only by frictional engagement. The expanding cone 61 is tightened slightly before the flywheel 25 is slipped on the output end 5, so that the coned sleeve 59 initially is already seated frictionally engaged in the front opening 57. FIG. 2 shows a design of a force-fit coupling 11a wherein the coned sleeve 59a is secured against axial withdrawal by a retaining ring 79 inserted in the front opening 57a of the output end 5a of the crankshaft 7a. As shown in FIG. 2A, the coned sleeve 59a' is secured by an annular flange 81 of the hub 45a' projecting radially inward. Since comparatively small securing forces are required, these may alternatively be applied from outside by the flywheel 25a.

Unlike the force-fit coupling of FIG. 1, in the arrangement of FIG. 2 the hub 45a of the flywheel 25a has no axial tubular projection, so that the sealing ring arrangement 15a is seated directly on a cylindrical outer periphery of the output end 5a. But here, too, the inside diameter of the sealing ring arrangement 15a is approximately equal to the bearing diameter of the crankshaft bearing 19a or the joining diameter of the opening 53a.

For tightening the force-fit coupling 11a, a rod 69a, provided with a thread at one end, is screwed into the threaded bore 65a of the expanding cone 61a through the hub of the clutch disc (not shown in FIG. 2). The end of the rod 69a is supported on the base of the front opening 57a and permits screwing the expanding cone 61a axially outward. A sleeve 73a, introduced axially through the hub of the clutch disc, or the rod 69a, which is loaded axially by pulsed forces, is in turn used for releasing the expanding cone 61a.

As a variant of FIG. 1, FIG. 2 in addition shows that the shaped metal part 49a of the flywheel 25a is fastened to the hub 45a by weld joints 83 at a joining face running axially. As shown in FIG. 2A, a weld joint 83' between the part 49a' of the flywheel 49' may extend radially. FIG. 2 further shows that the pilot bearing 67a, unlike in FIG. 1, is inserted into a central opening 66a of the expanding cone 61a. The pilot bearing 67a is arranged on the side of the threaded bore 65a situated toward the clutch and has an inside diameter greater than the diameter of the threaded bore 65a.

Figure 3:
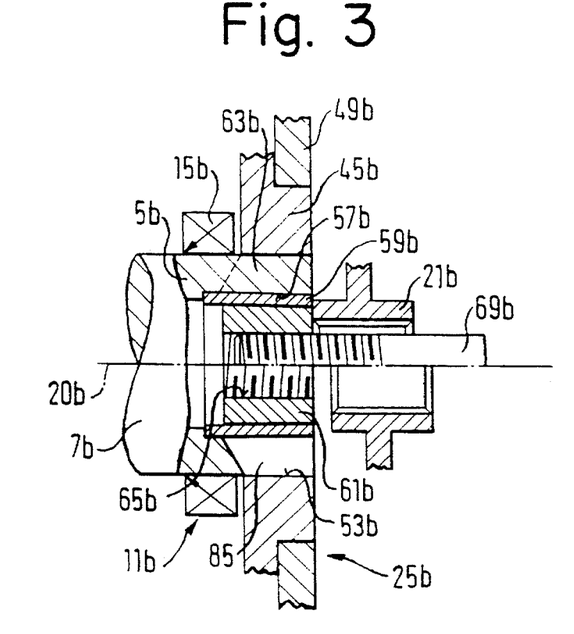

FIG. 3 shows another variant, in which the hub 21b of the clutch disc, with respect to its position situated at a distance from the output end 5b (as is represented in the lower half of FIG. 3), is movable all the way into a position adjacent to an axial front face of the coned sleeve 59b. In this position the hub 21b is used as a stop, applied from outside for the coned sleeve 59b during tightening of the force-fit coupling 11b. The axial motional clearance of the hub 21b may be provided by additional spring elements if axial springing of the clutch disc, for example its lining resilience, is insufficient for this. For the tightening motion of the expanding cone 61b, a connecting rod 69b is in turn screwed into the threaded bore 65b of the expanding cone 61b through the hub 21b.

The tubular extension 63b formed by the front opening 57b in the output end 5b of the crankshaft 7b is divided by a plurality of axial slots 85, distributed in peripheral direction, into tongues or segments extending axially. This measure reduces the tensional forces required for expansion of the tubular extension 63b.

Figure 4:
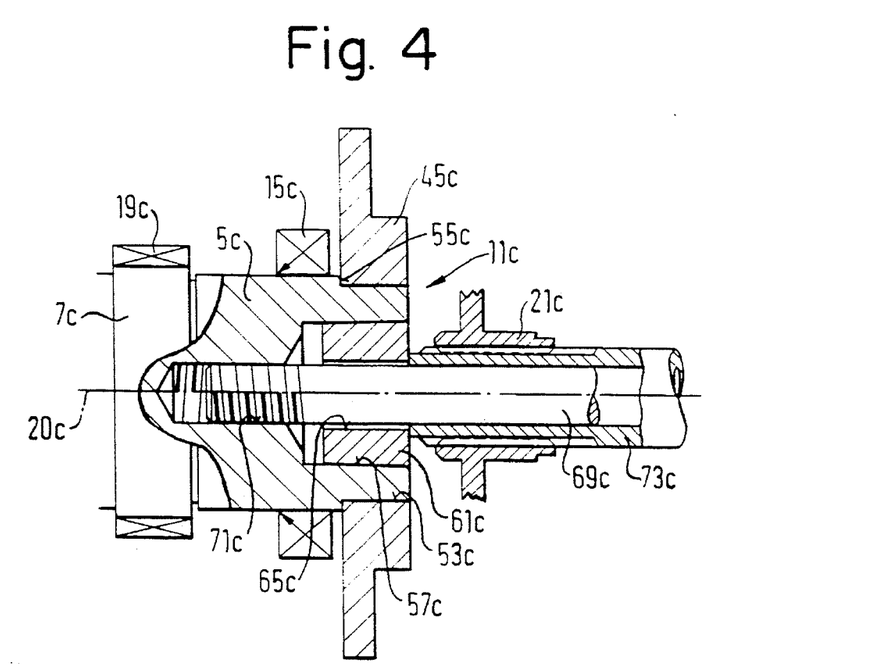

FIG. 4 shows a variant which differs from the embodiments described above in that the front opening 57c of the output end 5c of the crankshaft 7c forms a coned face, tapering toward the crankshaft, into which the expanding cone 61c is inserted directly, i.e., without a coned sleeve. In this case the force-fit coupling 11c is tightened by pressing the expanding cone 61c axially into the front opening 57c. FIG. 4 shows the tools used for this in assembly of the clutch. A connecting rod 69c is screwed through the hub 21c of the clutch disc into the threaded bore 71c of the crankshaft 7c concentric to the front opening 57c. The rod 69c absorbs the reaction forces of a pressure pipe 73c passing coaxially thereto through the hub 21c and loading the expanding cone 61c axially. Tightening of the force-fit coupling 11c may be effected by means of a hydraulic cylinder placed between the rod 69c and the pressure pipe 73c, but alternatively in pulsed operation by the pressure pipe 73c alone. For disassembly, the expanding cone 61c contains a threaded bore 65c through which the expanding cone 61c can be withdrawn. If the hub 21c can be sufficiently deflected axially and overlaps the expanding cone 61c radially, the axial tensional forces can alternatively be transmitted through the hub 21c to the expanding cone 61c.

Figure 5:
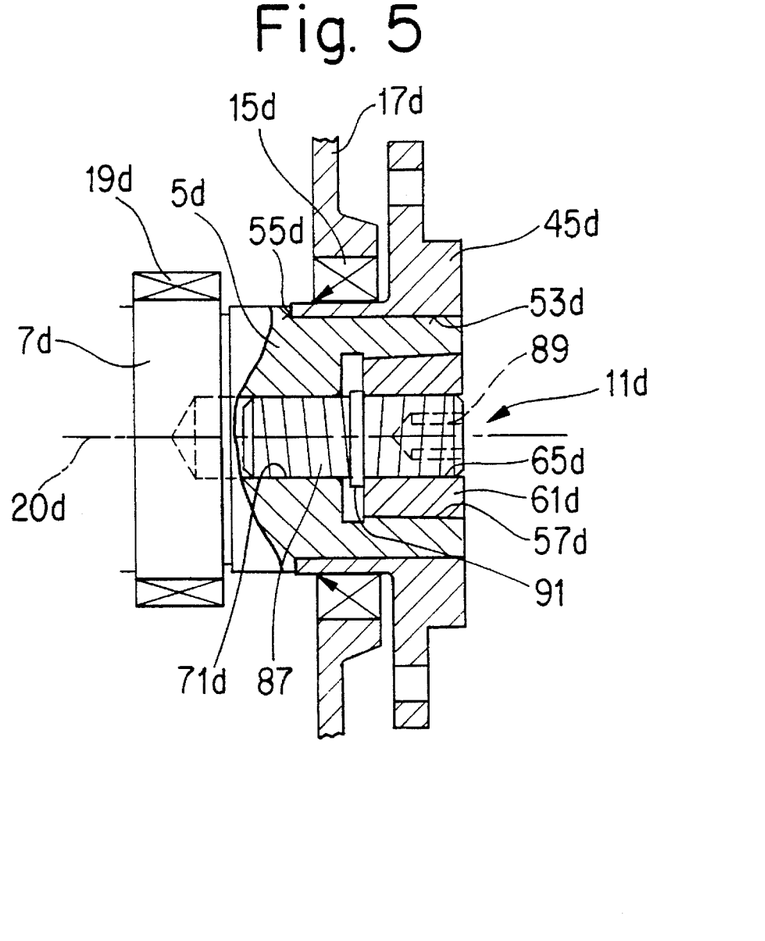

FIG. 5 shows a variant of a force-fit coupling 11d in which the expanding cone 61d, similar to the embodiment of FIG. 4, is seated directly in a front opening 57d of the output end 5d tapering axially toward the crankshaft 7d. The expanding cone 61d in turn has a central threaded opening 65d and the front opening 57d is alternatively extended by a equiaxial threaded bore 71d. However, the threaded-bores 65d and 71d have opposing thread directions and accommodate a differential threaded screw 87, whose central key faces 89 are accessible through the hub of the clutch disc, not shown, for a driver. By turning the differential threaded screw 87 the expanding cone 61d can be drawn into the inner cone of the front opening 57d and the force-fit coupling locked. The differential threaded screw 87 has an annular collar 91 located axially between the threaded bores 65d, 71d and projecting radially and overlapping the adjacent front face of the expanding cone 61d.

In a variant, the threaded bores 65d and 71d provided for accommodation of the differential threaded screw 87 may have the same thread direction but unlike thread pitches. This variant has the advantage that the transmission of axial force may be obtained by comparatively simple means.

Figure 5A:
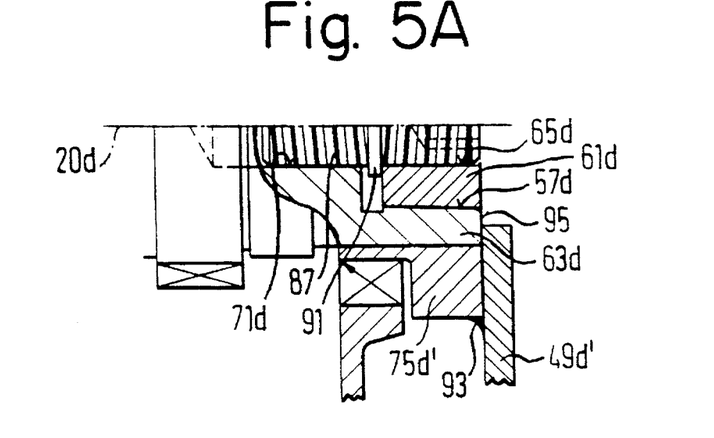

FIG. 5A shows still another variant for fastening the shaped metal part 49d to the hub 45d. The shaped metal part 49d overlaps the ring 75d of the hub 45d radially and is mounted by a fillet weld 93 made radially from outside. The shaped metal part 49d' projects radially inward over and beyond the ring 75d' and overlaps an axial front face 95 of the tubular extension 63d formed by the front opening 57d. The front face 95 forms an axial stop for positioning of the flywheel relative to the crankshaft as a replacement for the shoulder 55d represented in FIG. 5.

Figure 6:
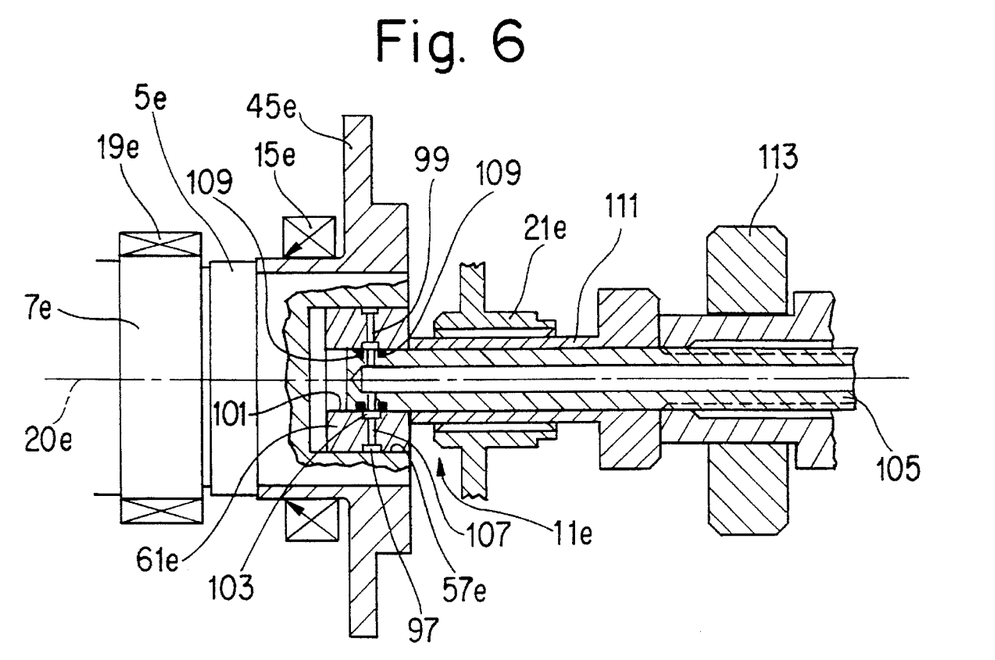

FIG. 6 shows an embodiment with an expanding cone 61e inserted directly in a central inner conical front opening 57e of the output end 5e of the crankshaft 7e, which may alternatively be used in embodiments with an additional coned sleeve. The expanding cone 61e contains in its conical outer surface a continuous annular groove 97, which is connected by one or more radial channels 99 with an annular groove 103 arranged at the inner periphery of a central bore 101 of the expanding member 61e. The bore 101 forms a pressure-medium connection for a hydraulic pressure pipe 105, sealed at the front, which is introduced into the bore 101 for releasing the expanding cone 61e. The hydraulic pressure pipe 105, in the region of its closed end, has radial outlets 107, which are sealed off by sealing rings 109 from the bore 101 on both sides of the radial channels 99. The radially outer annular groove 97 can be hydraulically charged and the force fit of the expanding cone 61e released by the hydraulic pressure pipe 105.

Figure 6A:
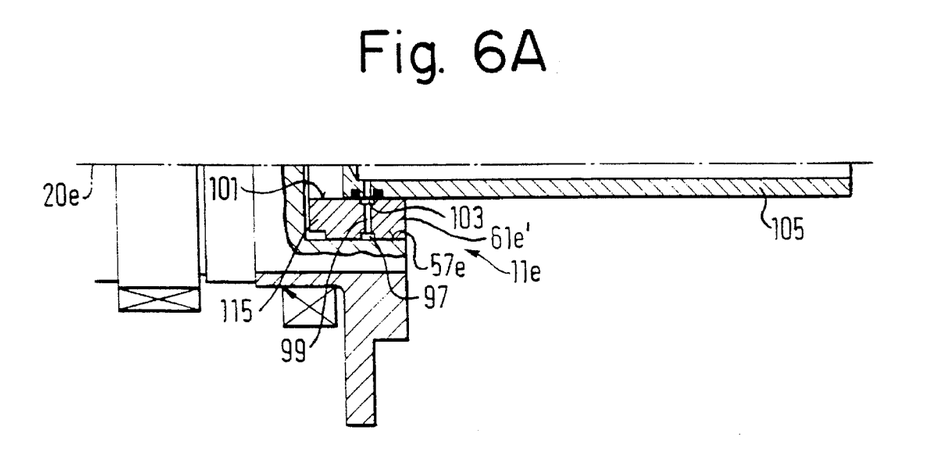

In addition, FIG. 6 shows details of an impact device for tightening the force-fit coupling 11e. The impact device comprises a sleeve 111 that is received to slide axially on the hydraulic pressure pipe 105, passes through the hub 21e of the clutch disc and rests on the expanding cone 61e by one end, with which an axially movable impact ring 113 is associated. To prevent the expanding cone 61e from being driven too far into the front opening 57e, an expanding cone 61e', as is represented in FIG. 6, 6A may be provided that has an axial projection 115, by which it strikes the base of the front opening 57e. The impact ring permits a pulsed axial load to be applied to the expanding cone 61e upon tightening of the force-fit coupling 11e. It is understood that the methods described above for diverting reaction forces from the crankshaft 7e may alternatively be applied in the variant of FIG. 6 and, in particular, instead of the hydraulic pressure pipe 105, the rod screwed through the hub 21e for diversion of the reaction forces into a central threaded continuation of the front opening 57e may provide guidance of the sleeve 111, since the hydraulic pressure pipe 105 is first of all part of a releasing tool.

Figure 7:
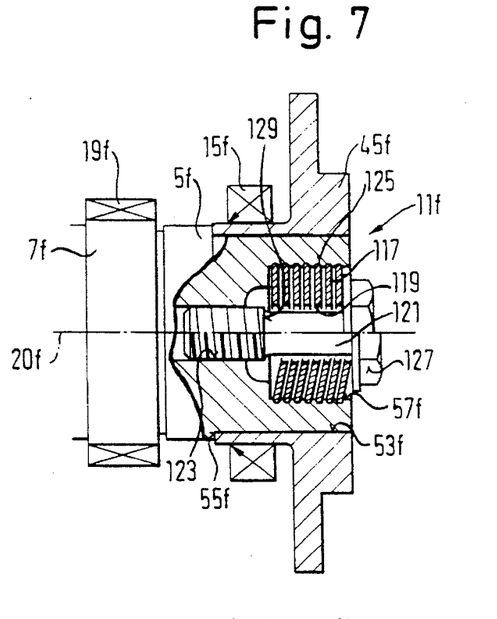

FIG. 7 shows an embodiment in which the expanding coupling 11f for radial expansion of the output end 5f of the crankshaft 7f comprises, instead of an expanding cone, a multiplicity of equiaxially adjacent Belleville springs 117 arranged in a stack lying flatwise adjacent each other. The Belleville springs 117 have central openings 119, aligned with one another, through which a clamping bolt 121 passes. The clamping bolt 121 is screwed into a threaded bore 123, which follows a central front opening 57f of the output end 5f of the crankshaft 7f accommodating the Belleville springs 117. The front opening 57f has an inner surface that is formed with a plurality of peripheral grooves 125 but is otherwise substantially cylindrical. The radially outer peripheral edge of each Belleville spring 117 is rounded and is seated in one of the grooves 125. In this way, damage to the edges of the springs 117 is prevented and the holding force of the springs is also increased.

As shown in FIG. 7, 7A, the Belleville springs 117 in the relaxed state have a slightly conical shape and when the clamping bolt 121 is tightened, they flatten out with an increase in their outside diameter, as represented in FIG. 7. Because of the increase in diameter of the springs 117, the joining faces between the hub 45f and the output end 5f are radially tightened. The head of the clamping bolt 121 has key faces 127, which are accessible axially through the hub of the clutch disc for a clamping tool. In order to be able to release the Belleville springs 125 easily, the clamping bolt 121 is provided on the side remote from the distal end of the crankshaft 7f with an annular shoulder 129 which overlaps the inner hole of the Belleville springs 117 and pushes the springs out when the clamping bolt 121 is unscrewed.

Figure 8:
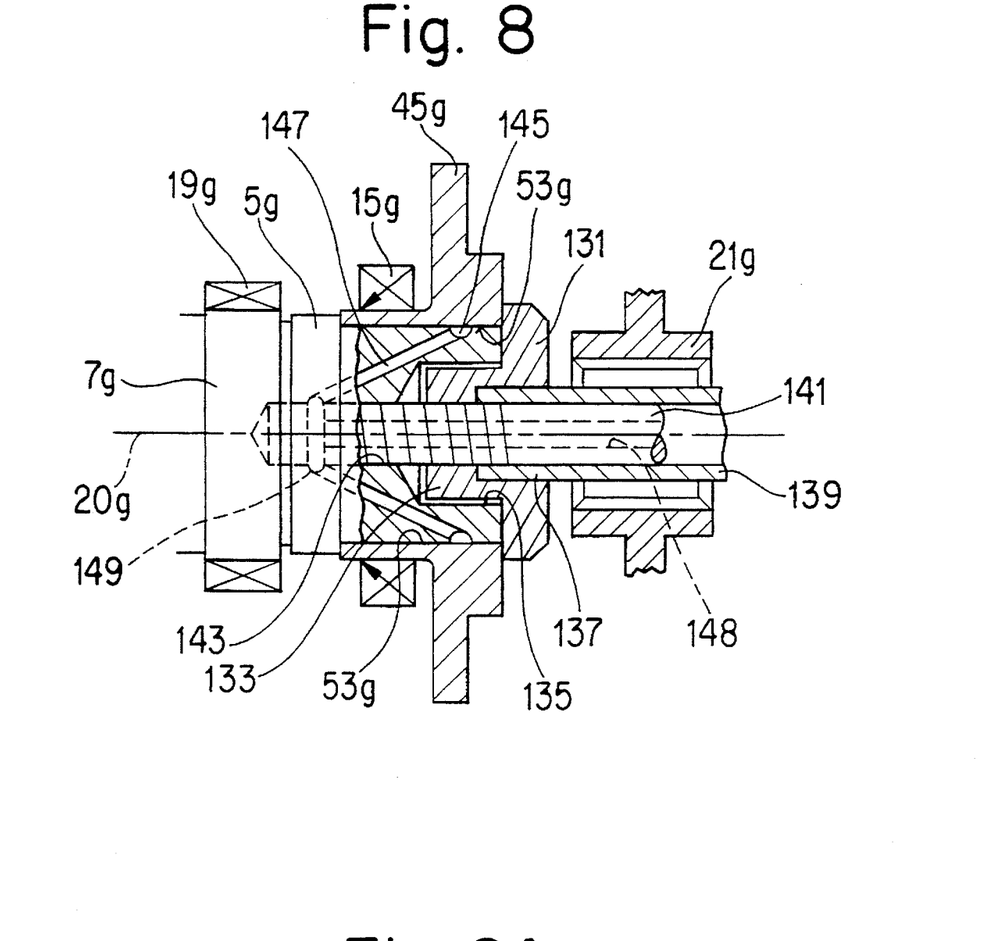

In the embodiments described above, the force-fit coupling is tightened radially by an expanding element, which is arranged in a central front opening of the output end of the crankshaft. FIG. 8 shows an embodiment which can likewise be tightened by axial forces of a tool introduced through the hub of the clutch disc, but without requiring an additional expanding element. A circular cylindrical joining face of the output end 5g engages in a central opening 53g of the hub 45g of the flywheel, these joining faces already being sized for a force fit. The joining faces alternatively may have a slightly conical shape, which permits the hub 45g to be held self-lockingly on the output end 5g. The hub 45g is pressed axially onto the output end 5g through the intermediary of an annular part 131. The annular part 131 has a boss portion 133 projecting toward the crankshaft and received in a central front opening 135 of the output end 5g of the crankshaft 7g. The annular part has a stepped bore 137, which enables it to be axially loaded by means of a pressing tool, such as a pipe 139, inserted through the hub 21g of the clutch disc A connecting rod 141, which is screwed into a central threaded bore 143 axially extending deeper, into the shaft from the base of the front opening 135, is received within the pipe. The forces exerted by the pipe 139 on the crankshaft 7g upon assembly can be diverted by a connecting rod 141 passing through the annular part 131 and the hub 45g.

Figure 8A:
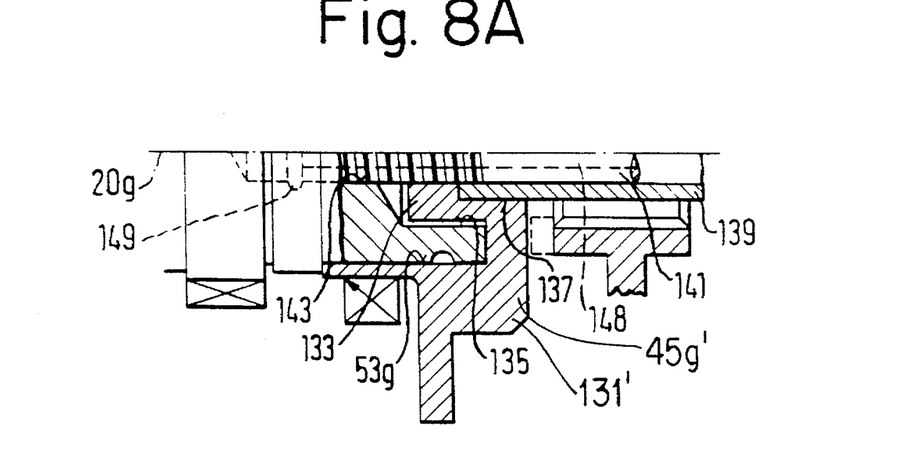

In the upper half of FIG. 8, the annular part 131 is represented as an element separate from the hub 45g. FIG. 8A shows that the annular part 131' alternatively may optionally be designed in one piece with the hub 45g'.

The annular part 131 radially overlaps not only the hub 45g of the flywheel, but also the hub 21g of the clutch disc. As indicated by the broken line in FIG. 8A, the hub 21g optionally may alternatively be deflected until it comes into surface contact with the annular part 131, so that the axial forces required for pressing on the hub 45g can alternatively be exerted through the intermediary of the hub 21g.

In order to be able to remove the hub 45g of the flywheel from the output end 5g more easily upon disassembly of the clutch, a continuous annular groove 145, which is connected by a channel 147 extending radially inward with a pressure-medium connection 149 formed by the threaded bore 143, is provided on the outer surface of the output end 5g. Upon disassembly, a hydraulic pressure medium may be supplied, as indicated at 148, through a pressure-medium pipe to be screwed sealed off into the threaded bore 143, which releases the interference fit radially, so that the hub 45g can easily be removed from the output end 5g.

Figure 9:
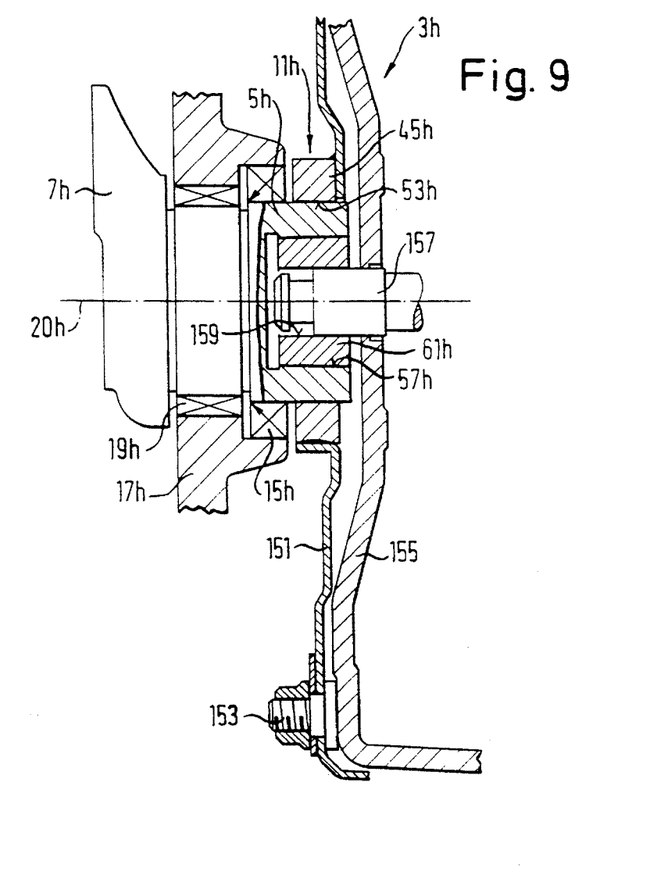
FIG. 9 is a partial axial longitudinal cross-sectional view through the crankshaft-side end region of a hydrodynamic clutch or a torque converter.

The preceding examples have been explained in connection with a modular clutch. It is understood that the force-fit connections may alternatively be used in conventional clutches, in which first only the flywheel is mounted on the crankshaft, before the pressure plate unit is installed on the flywheel. In addition, FIG. 9 shows that force-fit couplings of the type used according to the invention may alternatively be employed with advantage in other clutches, in particular, a hydrodynamic clutch or a torque converter. FIG. 9 shows a force-fit coupling 11h, by which a hub 45h of an input part, generally labeled 3h, of the clutch is fastened to the output end 5h of a crankshaft 7h turning about a rotary shaft 20h. The output end 5h at its outer periphery forms a joining face, by which it engages in a central opening 53h of the hub 45h forming an associated joining face. As has already been described in connection with FIG. 4, an expanding cone 61h is in turn seated directly in a central front opening 57h of the output end 5h, tapering axially toward the crankshaft 7h. By driving the expanding cone 61h axially into the front face 57h the output end 5h is expanded radially and the interference fit of the joining faces tightened radially. The input component 3h of the clutch, which may be a hydrodynamic clutch or a torque converter, comprises a disclike shaped metal part 151 fastened, for example welded, to the hub 45h, to which [part 151] a housing 155 of the converter is screwed with studs 153. The housing 155 bears a centering pin 157, which is carried radially in a central bore 159 of the expanding cone 61b. It is understood that, instead of the pin 157, a shaft passed through the converter optionally may alternatively be used. Since in this embodiment, the inside diameter of a sealing arrangement sealing off the output end 5h of the crankshaft 7h from the engine housing 17h is likewise substantially equal to the diameter of the adjacent crankshaft bearing 19h or the joining face diameter of the output end 5h, the sealing ring diameter may be kept very small and its frictional behavior improved.

In the embodiments of the force-fit coupling described above, the associated joining faces are held together in frictional engagement. However, it may in addition be provided that the joining faces or alternatively the associated coned surfaces of the expanding cone or the associated coned sleeve and/or the front opening of the output end be cemented together. On the one hand, cementing increases the transmissible torque, and, on the other, prevents fretting corrosion. Since the cement is applied in liquid form upon assembly, it at the same time serves as a lubricant that permits the joining faces to be sized not only with an assembly fit, but optionally with a transition fit. In a transition fit or optionally alternatively a force fit, the assembly process can be facilitated by thermal expansion of the hub of the input component.

In another variant, it may be provided that at least one of the two conical components participating in the tightening operation of the force-fit coupling be coated with a friction-reducing lubricant or else consist of a sintered material containing a lubricant.

While specific embodiments of the invention have been shown and described in detail to illustrate the application of the inventive principles, it will be understood that the invention may be embodied otherwise without departing from such principles.

What we claim is:

1. An arrangement comprising a crankshaft of an internal combustion engine of a motor vehicle, and a friction clutch having an input component fastened to an output end of the crankshaft and including as an output component a clutch disc having a hub axially aligned with the crankshaft and the output component being combined into an assembled unit with the input component before the input component is fastened to the output end of the crankshaft, wherein for fastening the input component of the clutch to the output end of the crankshaft a force-fit coupling is provided having on the input component and the output end associated joining faces extending substantially axially, and wherein tool-application surfaces are provided on the force-fit coupling, by which the joining faces, upon assembly, can be tightened against one another in a radial-force fit, the force-fit coupling being arranged so that it radially tightens the joining faces upon application of forces acting axially on the tool-application surfaces, the tool-application surfaces being accessible axially through the hub of the clutch disc and/or the hub of the clutch disc being capable of engaging the tool-application surfaces.

2. An arrangement according to claim 1, wherein the force-fit coupling is provided with tool-application surfaces through which the radial force fit of the joining faces is adapted to be released for disassembly, and wherein the tool-application surfaces are accessible axially through the hub of the clutch disc.

3. An arrangement according to claim 1, wherein the input component of the clutch is a flywheel and wherein the clutch is a modular clutch having a non-detachable clutch housing connected to the flywheel.

4. An arrangement according to claim 1, wherein the input component has a central opening forming one of the joining faces on its inner periphery, a portion of the output end of the crankshaft forms the other one of the two joining faces and is engaged in the central opening, and wherein the output end has a central front opening in which is seated an expanding element that tightens the output end radially outward against the input component.

5. An arrangement according to claim 4 wherein the expanding element has a cone-shaped outer surface and an axially loadable tool-application surface.

6. An arrangement according to claim 5, wherein the tool-application surface of the force-fit coupling is an axial front face on the expanding element engageable by a tool received through the hub of the clutch disc.

7. An arrangement according to claim 5, wherein the tools application surface of the force-fit coupling is an axial front face on the expanding element engageable by the hub of the clutch disc.

8. An arrangement according to claim 4, wherein the tool application surface is an internal thread in a central threaded hole in the expanding element.

9. An arrangement according to claim 1, wherein the joining faces form an interference fit and the input component has a portion that radially overlaps the axially movable hub of the clutch disc, the radially overlapping portion has a tool-application surface accessible axially through the hub, and the crankshaft has an axial tool-application surface.

10. An arrangement according to claim 9, wherein the input component has a central opening forming one of the joining faces, and the output end of the crankshaft has a portion received in the central opening and forming the other one of the two joining faces.

11. An arrangement according to claim 9, wherein the output end has a central front opening in which a guide pin portion of the annular part is received.

12. An arrangement according to claim 9, wherein the radially overlapping portion has a central axial threaded bore accessible axially from outside.

13. An arrangement according to claim 12, wherein the bore is a stepped bore widening toward the hub.

14. An arrangement according to claim 9, wherein one of the two joining faces contains at least one continuous annular groove which is connected by at least one radial channel of the crankshaft with a central pressure-medium connection, accessible axially from outside, in the region of the front opening.

15. An arrangement according to claim 1, wherein the joining faces form an interference fit, and the crankshaft includes a hub having an axial tool-application surface, and further comprising a central annular part arranged to move axially with the input component relative to the crankshaft and having a portion that radially overlaps the axially movable hub of the clutch disc, said radially overlapping portion having a tool-application surface accessible axially through the hub of the crankshaft.

16. An arrangement according to claim 1, wherein the joining faces form a coned interference fit, the input component has a portion that radially overlaps the axially movable hub of the clutch disc, and the radially over-lapping portion has an axial working surface against which the hub is engageable for application of a driving force on the input component, and wherein the crankshaft has a hub having an axial tool-application surface.

17. An arrangement comprising an internal combustion engine of a motor vehicle having a crankshaft rotating about an axis, the crankshaft having an output end, and a torque-transmitting device fastened to the output end of the crankshaft, wherein a force-fit coupling having associated joining faces extending substantially axially is formed between the inner periphery of a central opening of the input component and the outer periphery of a portion of the output end that extends axially into the opening, wherein the output end of the crankshaft has a central front opening, and wherein expanding means received in the opening and expanded radially outwardly by application of an axially applied force is provided for forming the force-fit between the associated joining faces, the expanding means including an expanding element having a conical outer surface and a coned sleeve having a conical inner surface received radially between the expanding element and the peripheral wall of the front opening, the conical inner surface of the coned sleeve tapering radially outwardly in a direction axially away from the output end of the crankshaft, and wherein the input component has an annular shoulder radially overlapping the coned sleeve and securing the coned sleeve against axial withdrawal from the front opening.

18. An arrangement according to claim 17, wherein a hub of a clutch disc of the torque-transmitting device radially overlaps an axial front face of the coned sleeve, the hub being axially displaceable into engagement with the front face of the coned sleeve and having, on the side facing axially away from the coned sleeve, an axial front face accessible axially from outside for the application of tools.

19. An arrangement according to claim 17, wherein thee expanding element has a central axial opening with undercut surfaces widening radially for the application of tools.

20. An arrangement according to claim 19 wherein the undercut surfaces are threads, the central axial opening being a threaded bore.

21. An arrangement according to claim 20, wherein the base of the front opening of the output end and the central threaded bore of the expanding element form supporting surfaces for tools adapted to be screwed into the threaded bore and draw the expanding element in the direction of tightening.

22. An arrangement according to claim 17, wherein the expanding element has a central axial hole extending entirely through it and accessible axially from outside and the crankshaft has a central axial threaded bore.

23. An arrangement according to claim 22, wherein the diameter of the bore of the crankshaft is equal to or smaller than the diameter of the central opening of the expanding element.

24. An arrangement according to claim 22, wherein the axial hole in the expanding element is threaded, wherein the threads of the hole in the expanding element and the threads in the axial bore in the crankshaft are of the opposite hand, and the expanding means further includes a common differential threaded screw threaded into the axial hole and the axial bore and accessible axially from outside.

25. An arrangement according to claim 24, wherein the differential threaded screw has a radial projection engageable with an inner face of the expanding element.

26. An arrangement according to claim 22, wherein the axial hole in the expanding element is threaded, wherein the threads of the hole in the expanding element and the threads in the axial bore in the crankshaft are of the same hand and have unlike pitches, and the expanding means further includes a common differential threaded screw threaded into the axial hole and the axial bore and accessible axially from outside.

27. An arrangement according to claim 26, wherein the differential threaded screw has a radial projection engageable with an inner face of the expanding element.

28. An arrangement according to claim 17, wherein the expanding element has a central opening receiving a pilot bearing for the radial guidance of a shaft that rotates relative to the input component.

29. An arrangement according to claim 17, wherein the expanding element has an opening extending entirely through it, and the front opening of the output end receives a pilot bearing, adjacent the side of the expanding element that is remote from the distal end of the output end, the pilot bearing being adapted to radially support a shaft that rotates relative to the input component.

30. An arrangement according to claim 17, wherein the expanding means includes a multiplicity of Belleville springs lying flat against one another and having central openings and a clamping bolt screwed into a central threaded bore of the crankshaft.

31. An arrangement according to claim 30, wherein the Belleville springs have rounded outer edges, and the inner surface of the front opening of the output end has a plurality of circumferentially continuous grooves in which the rounded outer edges of the Belleville springs are seated.

32. An arrangement according to claim 30, wherein the clamping bolt, on the side of the Belleville springs remote from the distal end of the crankshaft, has an annular shoulder radially overlapping the Belleville springs.

33. An arrangement according to claim 17, wherein the output end has, at least over part of the axial extent of its joining face, a plurality of circumferentially spaced apart axial slots.

34. An arrangement according to claim 17, wherein the joining faces are conical and self-locking.

35. An arrangement according to claim 17, wherein the joining faces are of a circular cylindrical shape.

36. An arrangement according to claim 17, wherein the input component and the output end of the crankshaft have axial annular stop faces engaging each other axially.

37. An arrangement according to claim 17, wherein the crankshaft is supported for rotation by a crankshaft bearing located proximate to the output end in an engine housing and is sealed off from the engine housing by means of a sealing ring arrangement, and in that the inside diameter of the sealing ring arrangement is at least approximately equal to the outside diameter of the joining face of the output end of the crankshaft and/or the inside diameter of the crankshaft bearing.

38. An arrangement according to claim 17, wherein the input component has an annular hub that forms the joining face of the input component and a thin disclike flange extending radially from the hub.

39. An arrangement according to claim 17, wherein the input component has an annular hub forming the joining face of the input component, and a tubular extension extending axially from the annular hub and having a radial wall thickness smaller than the radial thickness of the hub, and in that the joining face of the input component extends into the tubular extension.

40. An arrangement according to claim 17, wherein a cement is received between the joining faces to assist in holding them together.

41. An arrangement according to claim 17, wherein at least one of two associated joining faces of the force-fit coupling is coated with a friction-reducing lubricant.

42. An arrangement according to claim 17, wherein at least one of two associated joining faces of the force-fit coupling consists of a sintered material containing a lubricant.

43. An arrangement comprising an internal combustion engine of a motor vehicle having a crankshaft rotating about an axis, the crankshaft having an output end, and a torque-transmitting device fastened to the output end of the crankshaft and having an input component, wherein a force-fit coupling having associated joining faces extending substantially axially is formed between the inner periphery of a central opening of the input component and the outer periphery of a portion of the output end that extends axially into the opening, wherein the output end of the crankshaft has a central front opening, wherein expanding means received in the opening expanded radially outwardly by application of an axially applied force is provided for forming the force-fit between the associated joining faces, the expanding means including an expanding element having a conical outer surface, the front opening having a conical inner surface engageable by the conical outer surface of the expanding element, the conical inner surface of the front opening tapering radially inwardly in a direction axially away from the output end of the crankshaft, and the expanding element having a conical outer surface and an axial front face facing away from the output end of the crankshaft and accessible axially from outside for the application of tools.

44. An arrangement according to claim 43, wherein the torque-transmitting device has a hub of a clutch disc, and the hub radially overlaps the axial front face of the expanding element, is axially displaceable into engagement with the front face and, on its side axially remote from the expanding element has an axial front face accessible from outside for the application of tools.

45. An arrangement according to claim 43, wherein the conical outer surface of the expanding element has at least one annular groove which is connected by at least one radial channel of the expanding element with a pressure-medium connection of the expanding element accessible axially from outside.

* * * * *

UNITED STATES PATENT AND TRADEMARK OFFICE
CERTIFICATE OF CORRECTION

PATENT NO. : 5,480,016

DATED : January 2, 1996

INVENTOR(S) : Walter Kurz, Wolfgang Baier and Uwe Meinig

It is certified that error appears in the above-identified patent and that said Letters Patent is hereby corrected as shown below:

```
Col. 11, line 51, "flywheel 49'" should read
   --flywheel 25a'--;
Col. 12, line 60, "49d" should read--49d'--;
Col. 12, line 60, "75d" should read --75d'--;
Col. 12, line 60, "45d" should read --45d'--;
Col. 13, line 26, "FIG. 6, 6A" should read
   --FIG. 6A--;
Col. 13, line 57, "in FIG. 7, 7A," should read
   --at the bottom in FIG. 7,--;
Col. 14, line 30, "the upper half of FIG. 8"
   should read --FIG. 8--;
Col. 17, line 38, "wherein thee" should read
   --wherein the--.
```

Signed and Sealed this

Eighteenth Day of June, 1996

Attest:

BRUCE LEHMAN

*Attesting Officer*    *Commissioner of Patents and Trademarks*